US012002335B2

(12) United States Patent
Linck et al.

(10) Patent No.: US 12,002,335 B2
(45) Date of Patent: Jun. 4, 2024

(54) REMOTELY UPGRADABLE AUTOMATED BANKING MACHINE

(71) Applicant: Wincor Nixdorf International GmbH, Paderborn (DE)

(72) Inventors: Jochen Linck, Essen (DE); Thomas Certa, Paderborn (DE)

(73) Assignee: Wincor Nixdorf International GmbH, Paderborn (DE)

( * ) Notice: Subject to any disclaimer, the term of this patent is extended or adjusted under 35 U.S.C. 154(b) by 0 days.

(21) Appl. No.: 18/204,986

(22) Filed: Jun. 2, 2023

(65) Prior Publication Data

US 2023/0360501 A1 Nov. 9, 2023

Related U.S. Application Data

(63) Continuation of application No. 17/620,945, filed as application No. PCT/IB2020/055986 on Jun. 24, 2020, now Pat. No. 11,790,736.

(60) Provisional application No. 62/865,630, filed on Jun. 24, 2019.

(51) Int. Cl.
*G07F 19/00* (2006.01)

(52) U.S. Cl.
CPC .......... *G07F 19/206* (2013.01); *G07F 19/203* (2013.01); *G07F 19/207* (2013.01)

(58) Field of Classification Search
CPC ..... G07F 19/206; G07F 19/203; G07F 19/207
USPC .......................................................... 235/379
See application file for complete search history.

(56) References Cited

U.S. PATENT DOCUMENTS

| | | | | |
|---|---|---|---|---|
| 7,234,636 | B1 * | 6/2007 | Brausch | G07F 19/206 235/379 |
| 8,413,890 | B1 | 4/2013 | Billett | |
| 2011/0276807 | A1 | 11/2011 | Shin | |
| 2015/0106925 | A1 | 4/2015 | Maccari | |

FOREIGN PATENT DOCUMENTS

| | | | |
|---|---|---|---|
| WO | 9927465 | A1 | 6/1999 |

OTHER PUBLICATIONS

International Search Report filed in the corresponding PCT Application dated Aug. 28, 2020; 3 pages.
Written Opinion filed in the corresponding PCT Application dated Aug. 28, 2020; 5 pages.
International Preliminary Report on Patentability filed in the corresponding PCT Application dated Dec. 28, 2021; 6 pages.

* cited by examiner

*Primary Examiner* — Daniel A Hess
(74) *Attorney, Agent, or Firm* — Black McCuskey

(57) ABSTRACT

In an example embodiment, there is disclosed herein a technique that allows the capabilities of an automated banking machine, such as an ATM, to be upgraded remotely. For example, the banking machine may be sold or leased with an initial configuration. If the customer desires to add additional features, the customer can pay for the features and the manufacturer or dealer can send a signal from a remote host to the automated banking machine with data representative of the upgrade. The banking machine then operates with the upgraded configuration.

8 Claims, 3 Drawing Sheets

REMOTELY UPGRADABLE AUTOMATED BANKING MACHINE

CROSS-REFERENCE TO RELATED APPLICATIONS

This application is a continuation of U.S. application Ser. No. 17/620,945, filed 12-20-2021, for a Remotely Upgradable Automated Banking Machine, which is a National Phase filing of International Application Ser. No. PCT/IB2020/055986, for a Remotely Upgradable Automated Banking Machine, filed Jun. 24, 2020, which claimed the benefit under 35 U.S.C. § 119 of U.S. Provisional Application No. 62/865,630, filed Jun. 24, 2019. The contents of all of these applications are hereby incorporated by reference in their entireties.

BACKGROUND

1. Field

The present disclosure relates generally to controlling services provided by an automated banking machine such as an automated teller machine ("ATM").

2. Description of Related Prior Art

Automated banking machines are used by consumers to conduct banking transactions. A common type of automated banking machine is an automated teller machine ("ATM"). Common banking transactions conducted by users of automated banking machines include deposits and cash withdrawals. Some automated banking machines accept deposits in the form of envelopes, checks, cash, or other items. Automated banking machines may also be used for paying bills, transferring funds between accounts, and making balance inquiries. Automated banking machines and other types of automated banking machines may also be used to dispense media or documents (e.g., tickets, financial checks, coupons, scrip, wagering slips, vouchers, travelers checks, gaming materials, receipts, or other items). Other types of automated banking machines may include devices which count or deliver cash, sheets, documents, or other items of value to a consumer, bank teller, service provider, or other user, as well as point of sale ("POS") terminals and other terminals which enable users to carry out transactions of value. Automated banking machines are useful for carrying out transactions that include transfer of value.

SUMMARY

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an example embodiment, there is disclosed herein a technique that allows the capabilities of an automated banking machine, such as an ATM, to be upgraded remotely by sending software commands. For example, the banking machine may be sold or leased with an initial configuration. If the customer desires to add additional features, the customer can pay for the features and the manufacturer or dealer can send a signal from a remote host to the automated banking machine with data representative of the upgrade. The banking machine then operates with the upgraded configuration.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Figure 1:
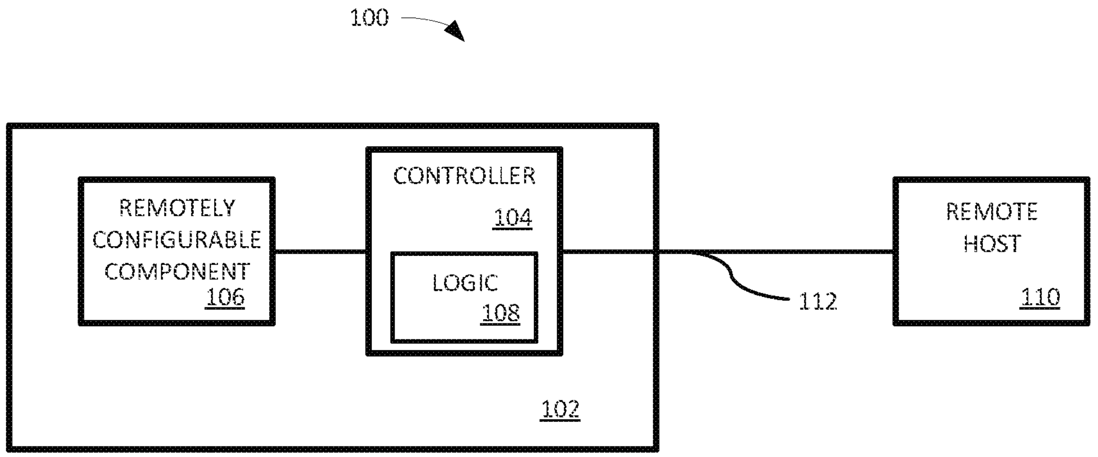
FIG. 1 is a block diagram illustrating an example of a system where a component of an automated banking machine that can be updated by a remote host.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is a block diagram illustrating an example of a system 100 comprising an automated banking machine 102 that can be updated by a remote host 110. The automated banking machine 102 comprises a controller 104 and a remotely configurable component 106 that is employed in a financial transaction. The controller further comprises logic 108 for implementing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software-controlled microprocessor, discrete logic such as an application specific integrated circuit (ASIC), a programmable/programmed logic device, memory device containing instructions, or the like, or combinational logic embodied in hardware. Logic may also be fully embodied as software that performs the desired functionality when executed by a processor.

The component 106 may be any type of upgradable component employed by automated banking machine 102. In an example embodiment, the component 106 may be one or more of a power control processor, a note holding cassette, a personal identification number ("PIN") pad, an additional cassette holding additional denominations of bills, a cash dispenser, currency files, a wireless reader (e.g., a near field communication "NFC" reader), a display, a card reader, a check acceptor, videoconferencing capabilities, or an optical scanner.

In an example embodiment, the automated banking machine 102 operates with the component 106 in an initial configuration. For example, the initial configuration can be a configuration that an owner/lessee of the automated banking machine 102 requested and paid for.

In an example embodiment, the owner/lessee may desire to upgrade the capabilities of one or more components 106 of the automated banking machine 102. Upon receiving payment for the upgrade, a vendor of the automated banking machine 102 (e.g., manufacturer, authorized reseller) can send a signal from remote host 110 via network 112 to the controller 104 with data representative of the upgrade. In an example embodiment, the message is authenticated by the controller 104. For example, the message from the remote host 110 may be encrypted with a key established between the controller 104 and the remote host 110. Alternatively, the message may comprise a message integrity check ("MIC"), message authentication check ("MAC"), or any other suitable authentication technique employing a key established between the controller 104 and the remote host 110 can be employed.

In an example embodiment, the controller 104 sends a command to the component 106 to implement the upgrade. In an example embodiment, the command is authenticated by the component 106. For example, the command from the controller 104 host may be encrypted with a key established between the controller 104 and the component 106. Alternatively, the message may comprise a message integrity check ("MIC"), message authentication check ("MAC"), or any other suitable authentication technique employing a key established between the controller 104 and the component 106 can be employed.

In response to the command from the controller 104, the component 106 performs the upgrade. The component is then operable to operate employing the upgraded feature. In an example embodiment, the component 106 may send a confirmation that the upgrade has been implemented. In particular embodiments, the controller 104 sends a confirmation to the remote host 110 via network 112.

In an example embodiment, the component 106 is a power controller and the upgrade is to employ smart power management. For example, smart power management may allow for alternative power sources, and where possible employ an alternate power source to use less utility provided power and/or to operate the automated banking machine 102 if utility power is unavailable. As another example, smart power management may comprise the ability to determine before a transaction is started whether the alternative power sources (e.g., battery, solar, etc.) have sufficient power available from alternate power sources to complete a transaction while utility power (e.g., power from a primary power source) is unavailable. If there is insufficient power, the transaction is not performed, preventing problems that may occur if the automated banking machine 102 runs out of power before the transaction can be completed. Still another example, smart power management may comprise the ability to receive signals from a utility company indicating when brownout or blackout conditions will occur enabling the power controller to take remedial measures.

In an example embodiment, the component 106 is a cassette for holding notes. The upgrade comprises increasing the capacity of the cassette. For example, the cassette may be upgraded from holding 1,000 notes to 2,000 notes, or any other physically realizable number.

In an example embodiment, the component 106 is a personal identification number ("PIN") pad. The upgrade comprises employing Encrypting PIN Pad ("EPP") features. In an example embodiment, the EPP encrypts PIN data that is sent to a transaction host. In other embodiments, the EPP may establish a key with an encrypting card reader ("ECR"). Encrypted card data can be decrypted with the key established with the ECR and re-encrypted with PIN data employing a key established with a transaction host and forwarded the encrypted card and PIN data to the transaction host.

In an example embodiment, the component 106 is cassette. In one example embodiment, the denominations stored in the cassette can be changed. The upgrade comprises updating the data representative of the denominations held in the cassette. In another example embodiment, the machine can employ different cassettes (e.g., the machine can have the capacity for employing five cassettes but is initially configured to use three cassettes). The additional cassettes can hold additional denominations for disbursement. Thus, the upgrade comprises employing the cassette (or additional portions of an active cassette) making additional denominations available. For example, initially the cassettes in the automated banking machine 102 can be configured to hold and/or distribute $10 bills or $20 bills. After the upgrade, there will be additional accessible cassettes holding $5 and/or $1 bills.

In an example embodiment, the component 106 is a cash dispenser. The upgrade comprises converting the dispenser to a cash recycler that both receive and distribute notes. In particular embodiments, the upgrade comprises enabling the cash recycler to also accept checks. For example, the cash recycler can obtain an image of a deposited check and transmit the image to a remote server for processing.

In an example embodiment, the component 106 comprises currency files. The upgrade comprises allowing access to the currency files by any component 106 (e.g., a smart cassette which has memory that can be accessed by another computing device that displays the data which is representative of the contents of the cassette, see e.g., U.S. Pat. No. 9,613,502 to Turocy et al., the contents of which are hereby incorporated by reference herein) and/or the controller 104.

In addition to the component upgrades described in the previous paragraphs herein, in other embodiments, the upgrades that may be implemented include, but are not limited to, enabling a peripheral hardware component in the form of a disabled wireless reader (e.g., a near field communication "NFC" reader), upgrade a display to a touch screen and/or encrypted touch screen, upgrade a card reader to an encrypting card reader, enabling a peripheral hardware component in the form of a disabled check acceptor, employ videoconferencing capabilities, and/or enabling a peripheral hardware component in the form of a disabled optical scanner. As those skilled in the art can readily appreciate, more than one component 106 can be upgraded at one time.

As those skilled in the art can readily appreciate, by employing a software update, a service technician will not have to be dispatched to the automated banking machine 102 to perform the upgrade. This can allow the upgrade to be implemented without having to wait for a service technician and/or without having to pay a service technician to perform the upgrade.

Figure 2:
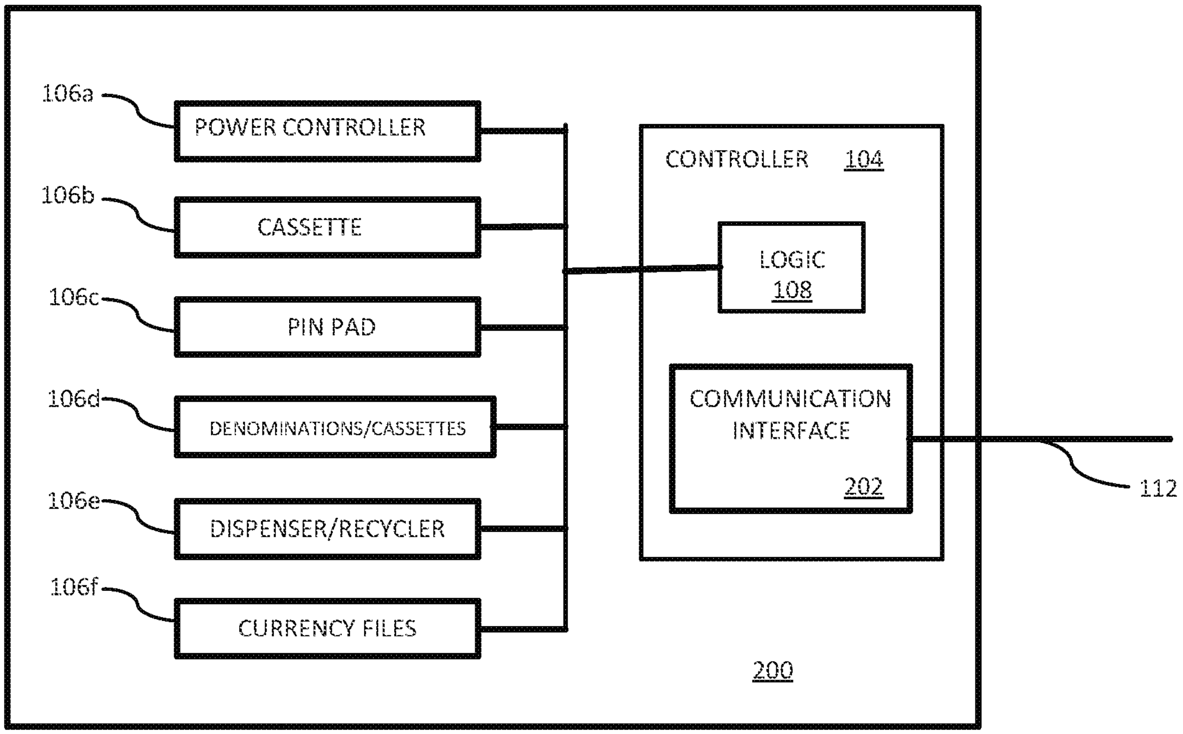
FIG. 2 is a block diagram illustrating an example of various components of an automated banking machine that can be updated by a remote host.

FIG. 2 is a block diagram illustrating an example of various components 106*a-f* of an automated banking machine 200 that can be updated by a remote host (not shown, see e.g., remote host 110 in FIG. 1). The communication interface 202 is operable to receive messages to upgrade one or more of the components 106*a-f*. The logic 108 in controller 104 is operable to send a command to the one or more components 106*a-f* to be upgraded in response to the message received from the remote host.

In an example embodiment, a message is received via communication interface 202 to upgrade the power controller 106*a* to employ smart power management. For example, smart power management may allow for alternative power sources and, where possible, employ an alternate power source to use less utility provided power and/or to operate the automated banking machine 102 if utility power is unavailable. As another example, smart power management may comprise the ability to determine before a transaction is started whether the alternative power sources (e.g., battery, solar, etc.) have sufficient power available from alternate power sources to complete a transaction while utility power (e.g., power from a primary power source) is unavailable. If there is insufficient power, the transaction is not performed, preventing problems that may occur if the automated banking machine 102 runs out of power before the transaction can be completed. Still another example, smart power management may comprise the ability to receive signals from a utility company indicating when brownout or blackout conditions will occur enabling the power controller to take remedial measures. In response to the message, the logic 108 sends a command to the power control processor 106*a* to implement the upgrade. In particular embodiments, the power control processor 106*a* is operable to send an acknowledgement to the logic 108 to indicate the upgrade has been implemented, and optionally, the logic 108 may send an acknowledgement to the remote host via communication interfaced 202 and network 112.

In an example embodiment, a message is received via communication interface 202 to upgrade a cassette 106*b* for holding notes. The upgrade comprises increasing the capacity of the cassette 106*b*. For example, the cassette 106*b* may be upgraded from holding 1,000 notes to 2,000 notes, or any other physically realizable number. In response to the message, the logic 108 sends a command to the cassette 106*b* to implement the upgrade. In particular embodiments, the cassette 106*b* is operable to send an acknowledgement to the logic 108 to indicate the upgrade has been implemented, and optionally, the logic 108 may send an acknowledgement to the remote host via communication interfaced 202 and network 112.

In an example embodiment, a message is received via communication interface 202 to upgrade the PIN pad 106*c* to an EPP. In an example embodiment, the EPP encrypts PIN data that is sent to a transaction host. In other embodiments, the EPP may establish a key with an encrypting card reader ("ECR"). Encrypted card data can be decrypted with the key established with the ECR and re-encrypted with PIN data employing a key established with a transaction host and forwarded the encrypted card and PIN data to the transaction host. In response to the message, the logic 108 sends a command to the PIN pad 106*c* to implement the upgrade. In particular embodiments, the PIN pad 106*c* is operable to send an acknowledgement to the logic 108 to indicate the upgrade has been implemented, and optionally, the logic 108 may send an acknowledgement to the remote host via communication interfaced 202 and network 112.

In an example embodiment, a message is received via communication interface 202 to update the denominations held in cassette 106*d*. In another example embodiment, the machine can employ different cassettes (e.g., the machine can have the capacity for employing five cassettes but is initially configured to use three cassettes). The additional cassettes can hold additional denominations for disbursement. Thus, the upgrade comprises employing the cassette making additional denominations available. For example, initially the cassettes in the automated banking machine 102 can be configured to hold and/or distribute $10 bills or $20 bills. After the upgrade, there will be cassettes with $5 and/or $1 bills. In response to the message, the logic 108 sends a command to the additional cassette 106*d* to implement the upgrade. In particular embodiments, the cassette (or additional cassette) 106*d* is operable to send an acknowledgement to the logic 108 to indicate the upgrade has been implemented, and optionally, the logic 108 may send an acknowledgement to the remote host via communication interfaced 202 and network 112.

In an example embodiment, a message is received via communication interface 202 to upgrade the cash dispenser/recycler 106*e*. The upgrade comprises converting the cash dispenser to a cash recycler that both receive and distribute notes. In response to the message, the logic 108 sends a command to the dispenser 106*e* to implement the upgrade. In particular embodiments, the dispenser/recycler 106*e* is operable to send an acknowledgement to the logic 108 to indicate the upgrade has been implemented, and optionally, the logic 108 may send an acknowledgement to the remote host via communication interfaced 202 and network 112. In particular embodiments, the upgrade comprises enabling the dispenser/recycler 106*e* to also accept checks. For example, the cash recycler can obtain an image of a deposited check and transmit the image to a remote server for processing via communication interface 202.

In an example embodiment, a message is received via communication interface 202 to download and/or employ currency files 106*f* The upgrade comprises allowing access to the currency files by any component 106 and/or the controller 104.

In an example embodiment, the upgrade may be to the logic 108. For example, the order of the actions taken for a process may be changed (e.g., the user's card is returned before cash is dispensed rather than before cash is dispensed).

Figure 3:
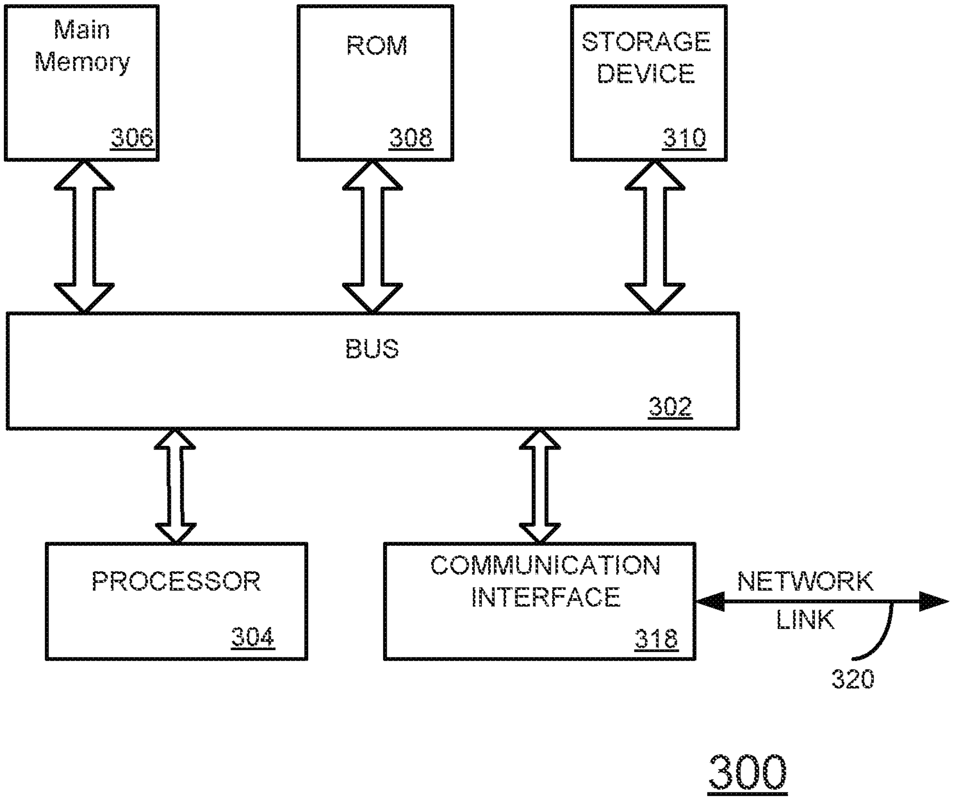
FIG. 3 is a block diagram of a computer system upon which an example embodiment can be implemented.

FIG. 3 is a block diagram that illustrates a computer system 300 upon which an example embodiment may be implemented. Computer system 300 may be employed for implementing the functionality of logic 108 (FIGS. 1 and 2) described herein.

Computer system 300 includes a bus 302 or other communication mechanism for communicating information and a processor 304 coupled with bus 302 for processing information. Computer system 300 also includes a main memory 306, such as random-access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or solid-state disk is provided and coupled to bus 302 for storing information and instructions.

An aspect of the example embodiment is related to the use of computer system 300 for implementing a remotely upgradable automated banking machine. According to an example embodiment, implementing a remotely upgradable automated banking machine is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media. Common forms of computer-readable media include for example, hard disk, magnetic cards, paper tape, any other physical medium with patterns of holes, a RAM, a PROM, an EPROM, a FLASHPROM, CD, DVD, SSD or any other memory chip or cartridge, or any other medium from which a computer can read.

Computer system 300 also includes a communication interface 318 coupled to bus 302. Communication interface 318 provides a two-way data communication coupling computer system 300 to a network link 320 that is connected to a local network (not shown, see e.g., network 112 in FIGS. 1 and 2). For example, communication interface 318 may be a local area network (LAN) card to provide a data communication connection to a compatible LAN. As another example, communication interface 318 may be an integrated services digital network (ISDN) card or a modem to provide a data communication connection to a corresponding type of telephone line. Wireless links may also be implemented. In any such implementation, communication interface 318 sends and receives electrical, electromagnetic, or optical signals that carry digital data streams representing various types of information.

Figure 4:
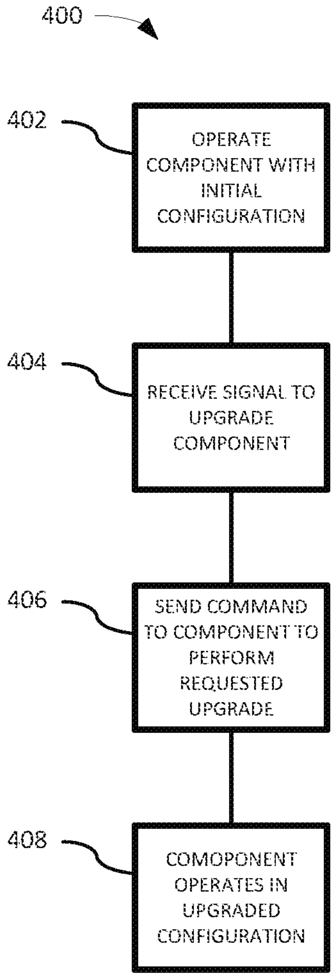
FIG. 4 is a block diagram of a method for upgrading an automated banking machine.

In view of the foregoing structural and functional features described above, a methodology 400 in accordance with an example embodiment will be better appreciated with reference to FIG. 4. While, for purposes of simplicity of explanation, the methodology 400 of FIG. 4 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required. The methodology 400 described herein is suitably adapted to be implemented in hardware, software when executed by a processor, or a combination thereof.

FIG. 4 is a block diagram of a method 400 for upgrading an automated banking machine. As those skilled in the art can readily appreciate, methodology 400 can be implemented by logic 108 (FIGS. 1 and 2) and/or processor 304 (FIG. 3).

At 402, the components of an automated banking machine are operating in their initial installed configuration. The automated banking machine configuration may have been agreed upon when the machine was bought or leased.

In accordance with an example embodiment, one or more components of the automated banking machine may be upgraded. Examples of components that may be upgraded include, but are not limited to, a power control processor, a note holding cassette, a personal identification number pad, a cassette, a cash dispenser, currency files, a wireless (NFC) a display a card reader a check acceptor, and/or an optical scanner. Upon receiving payment for the upgrades from the buyer/lessee, the sellor/lessor can operate a remote terminal to send a message to the automated banking machine to perform the upgrade. At 404, the automated banking machine receives a message to upgrade one or more components of the automated banking machine. The message may be encrypted and/or include a MIC or a MAC with a key established between the remote host and the automated banking machine.

At 406, a command is sent to the component with data representative of the upgrade in response to receiving the message. Examples of upgrades that may be performed are activate smart power management described herein supra, increase the note cassette's capacity, employ an EPP, update the denominations held in a cassette or employ cassettes or portions of cassettes with additional denominations, upgrade the cash dispenser to a cash recycler and/or check acceptor, and enable access to currency files. Other examples of upgrades are enabling a peripheral hardware component in the form of a disabled wireless (e.g., NFC) reader, upgrade a display to a touch screen and/or encrypted touch screen, upgrade a card reader to an ECR, enabling a peripheral hardware component in the form of a disabled check acceptor, employ videoconferencing capabilities, and/or enabling a peripheral hardware component in the form of a disabled optical scanner. The command may be encrypted and/or include a MIC or a MAC with a key established with the component being upgraded.

At 408, the component implements the upgrade. Upon implementing the upgrade, the components component operates with the upgraded configuration.

In an example embodiment, the component may send an acknowledgement to the automated banking machine acknowledging the upgrade was implemented. Optionally, the automated banking machine can send an acknowledgement to the remote host where the upgrade message originated acknowledging the upgrade was implemented.

As those skilled in the art can readily appreciate, by employing methodology 400 to implement an upgrade, a service technician will not have to be dispatched to the automated banking machine to perform the upgrade. This can allow the upgrade to be implemented without having to wait for a service technician and/or without having to pay a service technician to perform the upgrade.

Described above are example embodiments. It is, of course, not possible to describe every conceivable combination of components or methodologies for purposes of describing the example embodiments, but one of ordinary skill in the art will recognize that many further combinations and permutations of the example embodiments are possible. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method of operating an automated teller machine ("ATM") comprising:

obtaining the ATM by an operator with a peripheral hardware component of the ATM in a disabled state;

first operating the ATM, by the operator, after said obtaining, with the peripheral hardware component of the ATM in the disabled state;

receiving, after said first operating, by a controller of the ATM, from a remote host, a signal to enable the peripheral hardware component;

sending, by the controller, a command to the peripheral hardware component to enable; and second operating the ATM, after said first operating, with the peripheral hardware component enabled.

2. The method of claim 1 wherein said obtaining is further defined as:

obtaining the ATM by the operator with the peripheral hardware component of the ATM in the form of a near field communication ("NFC") reader in the disabled state.

3. The method of claim 2 wherein said second operating is further defined as:

second operating the ATM, after said first operating, with the NFC reader enabled.

4. The method of claim 1 further comprising:

activating enabling the peripheral hardware component from the disabled state after said sending and before said second operating.

5. The method of claim 1 wherein said obtaining is further defined as:

obtaining the ATM by the operator with the peripheral hardware component of the ATM in the form of a check acceptor in the disabled state.

6. The method of claim 5 wherein said second operating is further defined as:

second operating the ATM, after said first operating, with the check acceptor enabled.

7. The method of claim 1 wherein said obtaining is further defined as:

obtaining the ATM by the operator with the peripheral hardware component of the ATM in the form an optical scanner in the disabled state.

8. The method of claim 7 wherein said second operating is further defined as:

second operating the ATM, after said first operating, with the optical scanner enabled.

* * * * *